(12) United States Patent
Zhang et al.

(10) Patent No.: US 8,141,120 B2
(45) Date of Patent: Mar. 20, 2012

(54) ADAPTIVE SCHEDULING OF STREAMING VIDEO OVER WIRELESS NETWORKS

(75) Inventors: Honghai Zhang, Ewing, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 497 days.

(21) Appl. No.: 12/348,588

(22) Filed: Jan. 5, 2009

(65) Prior Publication Data
US 2009/0193484 A1 Jul. 30, 2009

Related U.S. Application Data

(60) Provisional application No. 61/018,762, filed on Jan. 3, 2008.

(51) Int. Cl.
*H04N 7/173* (2011.01)
(52) U.S. Cl. ............... 725/96; 725/95; 725/62
(58) Field of Classification Search ........ 725/62, 725/75–97; 370/395.4, 395.41, 395.42, 468
See application file for complete search history.

(56) References Cited

U.S. PATENT DOCUMENTS

| | | | | |
|---|---|---|---|---|
| 5,506,844 | A * | 4/1996 | Rao | 370/468 |
| 7,558,201 | B2 * | 7/2009 | Sang et al. | 370/230 |
| 2005/0188407 | A1 * | 8/2005 | van Beek et al. | 725/81 |
| 2006/0026294 | A1 * | 2/2006 | Virdi et al. | 709/232 |
| 2007/0002750 | A1 * | 1/2007 | Sang et al. | 370/238 |
| 2008/0253372 | A1 * | 10/2008 | Chan et al. | 370/392 |
| 2008/0259799 | A1 * | 10/2008 | van Beek | 370/235 |
| 2009/0249405 | A1 * | 10/2009 | Karaoguz et al. | 725/62 |
| 2010/0020823 | A1 * | 1/2010 | Bai et al. | 370/468 |

OTHER PUBLICATIONS

Knapsack problem, wikipedia, http://en.wikipedia.org/wiki/Knapsack_problem, 2009.
Chou et al, Rate-Distortion Optimized Streaming of Packetized Media, IEEE Transactions on Multimedia, vol. 8, No. 2, Apr. 2006.
Setton et al, Congestion-Distortion Optimized Scheduling of Video Over a Bottleneck Link, 2004 IEEE 6th Workshop on Multimedia Signal Processing, 2004.
Setton et al, Congestion-Optimized Scheduling of Video Over Wireless Ad Hoc Networks, IEEE International Symposium on Circuits and Systems, 2005. ISCAS 2005.
Lu et al, A time-based adaptive retry strategy for video streaming in 802.11 WLANs, Wirel. Commun. Mob. Comput. 2007; 7:187-203, 2007.
Author Unknown, Collection of Papers, published before Apr. 1, 2009.

* cited by examiner

*Primary Examiner* — Pankaj Kumar
*Assistant Examiner* — Timothy Newlin
(74) *Attorney, Agent, or Firm* — Bao Tran; Joseph Kolodka

(57) ABSTRACT

An adaptive scheduling process is disclosed which dynamically decides which frames need to be transmitted and which ones need to be dropped at any transmission opportunity based on current channel conditions and on characteristics of each video frame.

5 Claims, 12 Drawing Sheets

| 1 | 2✕ | 3 | 4 | 5 | 6 |

Current time | F1.deadline 2 / F1.size 1 | F2.deadline 6 / F2.size 4

| 1 | 2✕ | 3 | 4 | 5✕ | 6 |

Current time | F1.deadline 2 / F1.size 1 | F2.deadline 6 / F2.size 4

FIG. 4

(b) Mother_and_daughter video sequence (a) Foreman video sequence

ADAPTIVE SCHEDULING OF STREAMING VIDEO OVER WIRELESS NETWORKS

This application claims priority to provisional application Ser. No. 61/018,762, filed Jan. 3, 2008, the content of which is incorporated-by-reference.

BACKGROUND

Recent advances in 3 G/4 G wireless networks have significantly improved the bandwidth of wireless networks. It is envisioned that the IMT-advanced (the official name of 4 G by ITU-R) will support peak data rates of 100 Mbps for high mobility services and 1 Gbps for low mobility services. As a result, streaming of multimedia content such as video and audio over the Internet with a 4 G wireless last hop becomes a reality. However, high channel error rate and variable channel bandwidth are fundamental characteristics of wireless networks. Even the latest wireless networking standards do not provide sufficient support for QoS sensitive multimedia applications. Moreover, multimedia content and data packets often have different QoS requirements. Multimedia packets are generally error tolerant but delay sensitive while data packets are often error intolerant but delay insensitive. Therefore, they need to be treated differently over the Internet and especially over the wireless hop.

An important problem in streaming media is how to adapt the transmission rate to variable network conditions. One approach is to adapt the source rate to match the channel rate. In theory, this is the optimal way to adapt to channel condition if the channel rate is known precisely ahead of time. In practice, this approach incurs a large delay on the adaptation as the channel state information needs to be sent to the multimedia server and multimedia server has to wait for the next clear point (e.g., I-frame) in order to switch to a different rate. In addition, there is often only a limited number of source rates available at the video server, which cannot match exactly the channel bandwidth. As the channel conditions keep on changing, this may keep the video server oscillating between different coding rates.

In the past few years, work has been done on the rate-adaption of video streaming. For example, one approach optimizes the Lagrangian function of rate and distortion and provides an iterative procedure to find a sub-optimal solution of the problem. The Lagrangian function represents a trade-off between the rate and distortion for video transmission. In another solution, network congestion measured by the delay is used to replace the rate in the Lagrangian function to optimize the tradeoff between network congestion and the distortion. In yet another approach, each packet is assigned a re-transmission deadline and the packet is re-transmitted until its deadline has passed.

SUMMARY

An adaptive scheduling process is disclosed which dynamically decides which frames need to be transmitted and which ones need to be dropped at any transmission opportunity based on the current channel conditions and on the characteristics of each video frame.

In one aspect, a method to transmit streaming video over a wireless network channel with periodic transmission opportunities include receiving a plurality of video frames for transmission, each frame having an importance θ and a deadline by which each packet of the frame must be received; running a scheduler to transmit video frames at each transmission opportunity, wherein the scheduler maximizes the total importance for all frames to be received within each frame deadline by applying dynamic programming on a small window of frames, and updating the scheduler with a channel feedback.

In another aspect, a method to transmit streaming video having a plurality of frames over a wireless channel, each frame having an importance measure relating to video quality, the method includes maximizing a total importance measure for all frames to be received within each frame deadline through dynamic programming with a small window of frames; dynamically scheduling one or more frames to be transmitted or dropped at each transmission opportunity based on current channel conditions and on characteristics of each video frame; and updating the dynamic schedule with a channel feedback.

In yet another aspect, a video transmission system includes a wireless transceiver to transmit a plurality of video frames, each frame having an importance θ and having a deadline by which each packet of the frame must be received, the wireless transceiver communicating over a network channel with periodic transmission opportunities; and a scheduler to select one or more frames to transmit at each transmission opportunity, wherein the scheduler maximizes a total importance for all frames to be received before each frame deadline with dynamic programming applied on a small window of frames, wherein the scheduler is updated with channel feedback and re-run at each new transmission opportunity.

In one implementation, the system can determine $u(i, T)$ as a maximum utility (importance) that can be attained with frames up to i and with a deadline up to T. The system can determine which frames to transmit and which ones to drop based on the video frame sizes, deadlines, utilities (importance), and random channel error probability. The system can recursively determine the expected utility $u(i,T)$ as $$u(i,T)=\max(u(i-1,T),\max(u(i-1,T-k)P_{l_i,k}+\theta_i, \text{ over } l_i \leq k \leq T, \text{ and } P_{l_i,k} \leq 1-\delta))$$

where $P_{l_i,k}$ is the probability of having at least $l_i$ successful transmissions out of k attempts, $l_i$ is the length of frame i measured in number of slots required to transmit the frame. Frame(s) can be dropped based on deadline, size, and importance of each frame. The network channel has a random erasure probability and the scheduler can maximize an expected importance. The problem can be formulated as a knapsack problem with deadline constraints and randomness of packet losses (errors) and solved using specialized dynamic programming. The scheduler prioritizes packet transmission and selectively drops packets at a wireless last hop. Packets that are the least important in terms of overall PSNR are dropped first. The scheduler can operate without communication between a video server and a base station. The scheduler can operate with a base station scheduler to exploit channel and user diversity over a multi-carrier and multi-user wireless network.

In yet other implementations, the scheduling problem is modeled as a realtime scheduling problem in error-prone environments. Each video frame can be segmented into l packets, each of which can be transmitted in one slot. Each video frame has different importance θ which measures how much distortion can be reduced if it is correctly received. Each frame has a deadline by which the packets must be received in order to play the video smoothly. The network link layer provides a transmission opportunity periodically and when a packet is transmitted, it has a certain probability to be erased by the wireless channel (which is the channel erasure probability). The system uses a transmission/scheduling policy that optimally chooses a frame to transmit at each transmission opportunity in order to maximize the total importance of all frames that are successfully received before their deadline. The scheme considers the importance, the size, and the deadline of each frame. When the channel has a fixed erasure probability, the system maximizes the expected importance. The problem is formulated as a knapsack problem with additional deadline constraints and randomness of the packet error. A dynamic programming solution is adapted to solve this problem.

Advantages of the preferred embodiments may include one or more of the following. First, the system only transmits one packet in each transmission opportunity and does not introduce burstyness of the traffic. Therefore it eliminates the requirement of advanced window and rate control schemes. Second, the system considers multiple frames jointly and enables optimization across a window of frames. The size of the window is controllable and simulations show a small window size is sufficient to achieve very good performance. Simulation studies show that the system achieves near-optimal results. Although the system operates on video transmissions, the system can be applied to other multimedia content as well.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 4(a) and 4(b) show an exemplary illustration of a frame dropping decision process due to channel conditions.

DESCRIPTION

Disclosed herein are systems and methods for providing streaming video over wireless networks. To facilitate description of the inventive systems, an example system that can be used to implement the systems and methods for video streaming over wireless networks are discussed with reference to the figures. Although this system is described in detail, it will be appreciated that this system is provided for purposes of illustration only and that various modifications are feasible without departing from the inventive concept.

For example, while several embodiments are described in connection with these drawings, there is no intent to limit the invention to the embodiment or embodiments disclosed herein. On the contrary, the intent is to cover all alternatives, modifications, and equivalents. Additionally, while the following description and accompanying drawing specifically describes video streaming over wireless frequencies, it will be clear to one of ordinary skill in the art that the systems and methods presented herein may be extended to other multimedia streaming applications such as voice-over Internet protocol (VoIP), video conferences, etc. After the example system has been described, an example of the operation of the system will be provided to explain the manner in which the system can be used to provide a video streaming wireless system.

Figure 1:
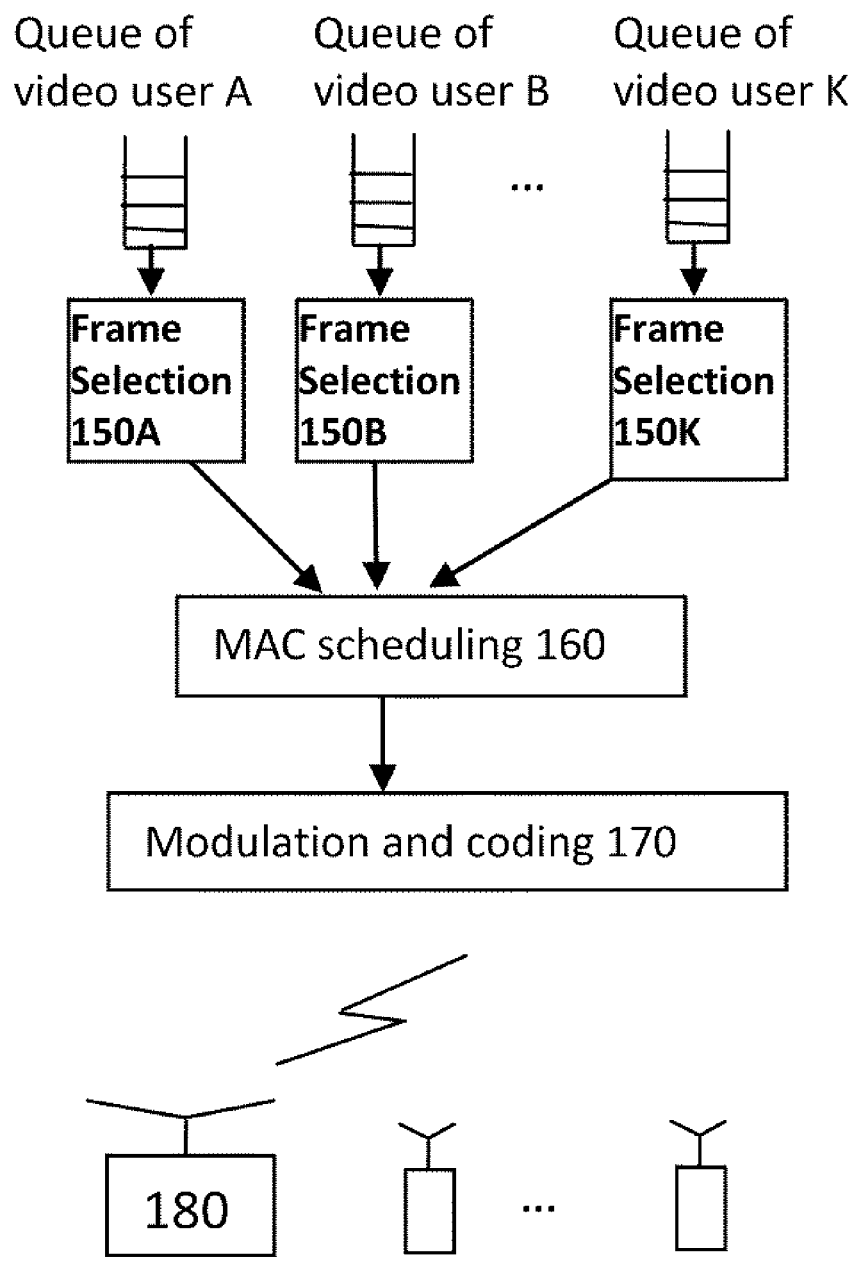
FIG. 1 is a block diagram depicting a video stream adaptive frame rate system for wireless transmission.

Referring now in more detail to the drawings, in which like numerals indicate corresponding parts throughout the several views, FIG. 1 is a block diagram depicting a system in which a video streaming system over wireless networks may be implemented. The system includes one or more video source devices, a wireless network, one or more mobile video receiving devices, or fixed destination devices connected to displays.

In FIG. 1, an exemplary system for adaptive scheduling of streaming video over 4 G wireless networks is shown. The system provides a frame selector operating between video user queues A-K and a MAC scheduling process 160 in a base station. Each video user is assigned to one frame selector block 150A-150K. Each of blocks 150A-150K decides, upon an allocation of bandwidth from the MAC scheduler 160, which video frames need to be transmitted and which ones need to be dropped in order to maximize the video quality (measured in PSNR). In one embodiment, the MAC scheduler 160 provides certain quality of service (QoS) guarantee such as the average scheduling period and average bandwidth allocation. The output of the MAC scheduler 160 is sent to a modulation and coding block 170 for transmission to wireless devices 180 which can be fixed or mobile devices.

In an example, the video source device captures a video source at certain number of frames per second, for instance 30 frames per second, utilizing any known video capture methods such as sampling, encoding, compression, or MPEG, among others. The number of frames captured at the video source device may not be exact and may deviate a few percentages above or below the desired frame rate per second. The video source device can include a buffer (not shown) that fills as the video source is captured. In an example, the buffer is included on an adapter card in the video source device such as a personal computer that begins to fill when writing to the buffer. The buffer continues to fill with the video source data, sends the video data to the network and begins filling again. Thus, the buffer fills in a continuous circular process.

The network may be a wireless network, preferably a broadband wireless network such as WiMAX. The network can also be a WiFi wireless network, or can also be any type of communications network employing any network topology, transmission medium, or network protocol. For example, such a network may be any public or private packet-switched or other data network, including the Internet, circuit-switched network, such as a public switch telecommunications network (PSTN), or any other desired communications infrastructure and/or combination of infrastructure.

The playback destination device can be a cell phone or a suitable handheld or mobile computer. The fixed playback destination device receives the video data from the network and places the video into a playback buffer (not shown). In an example, the playback buffer starts filling with video data in memory and continues to fill until the buffer reaches a certain point of fullness, at which time the playback buffer plays the video out on the display device.

Figure 2A:
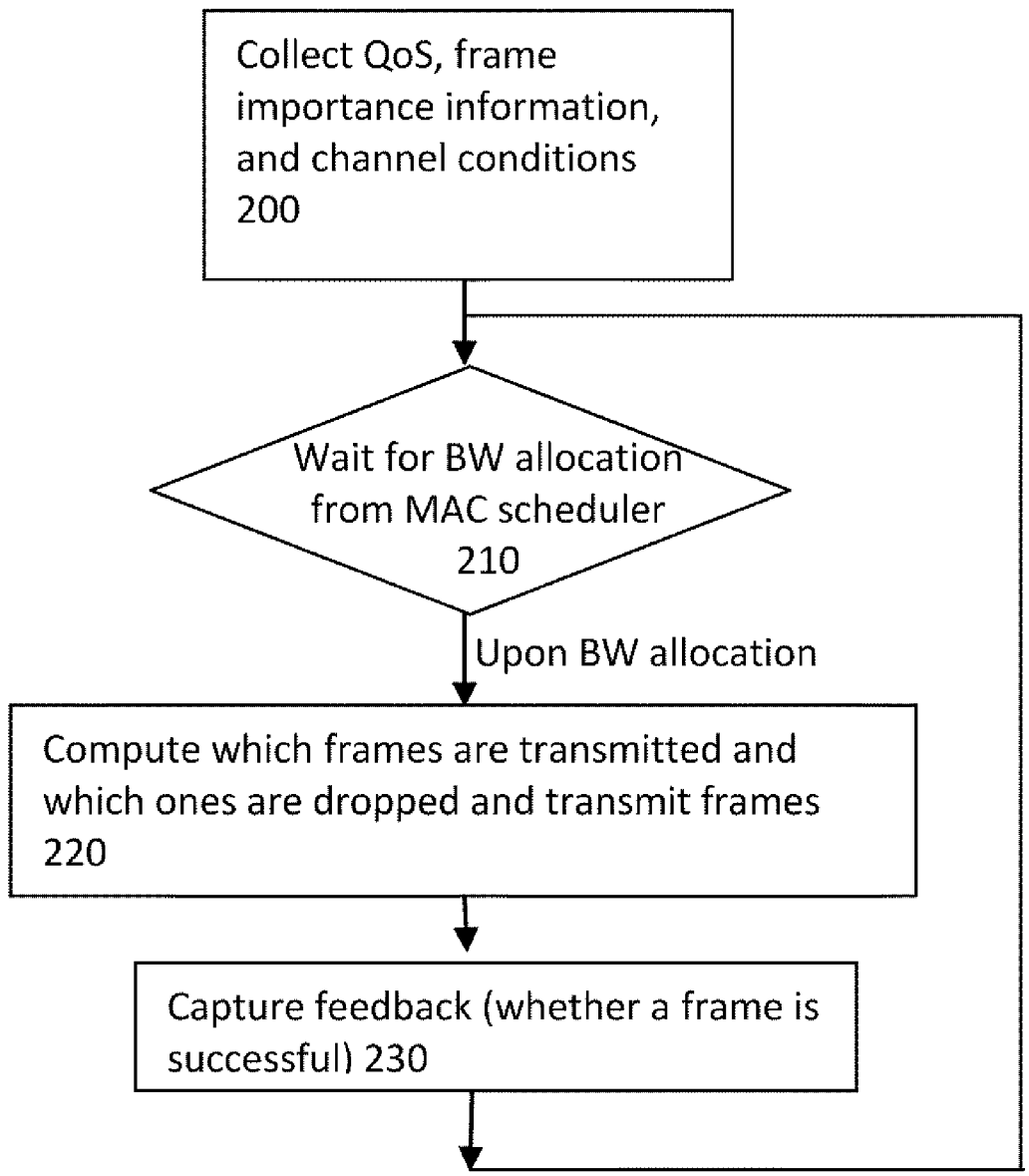
FIG. 2A shows an exemplary frame selection process.

Referring now to FIG. 2A, an exemplary frame selection process is detailed. In 200, a video server negotiates with base station (BS) MAC scheduler on the QoS guarantee and such information is saved by the frame selection process. The frame selection process exchanges with the video server about the video frame importance information such as the PSNR loss if any frame is lost. This value can be given for each individual frame or for the average of each frame based on their types and locations in the GOP (group of picture). If such information is not available, it can use the number of frames that are affected by the current frame as the importance of the current frame. The frame selection process also estimates the channel error probability based on historical transmissions.

In 210, the frame selection process waits for the MAC scheduling process to allocate bandwidth to it. It can provide certain information such as queue length to facilitate the MAC scheduling process. When the bandwidth is allocated to a given video user, in 220, the frame selection process computes which frames need to be transmitted and which ones need to be dropped in order to maximize the received video quality subject to deadline constraints. The process also receives feedback on whether a frame transmission is successful in 230. Feedback (whether a packet is transmitted successfully) is collected, channel error probability is updated, and the process waits for the next bandwidth allocation from the MAC scheduling process.

Figure 2B:
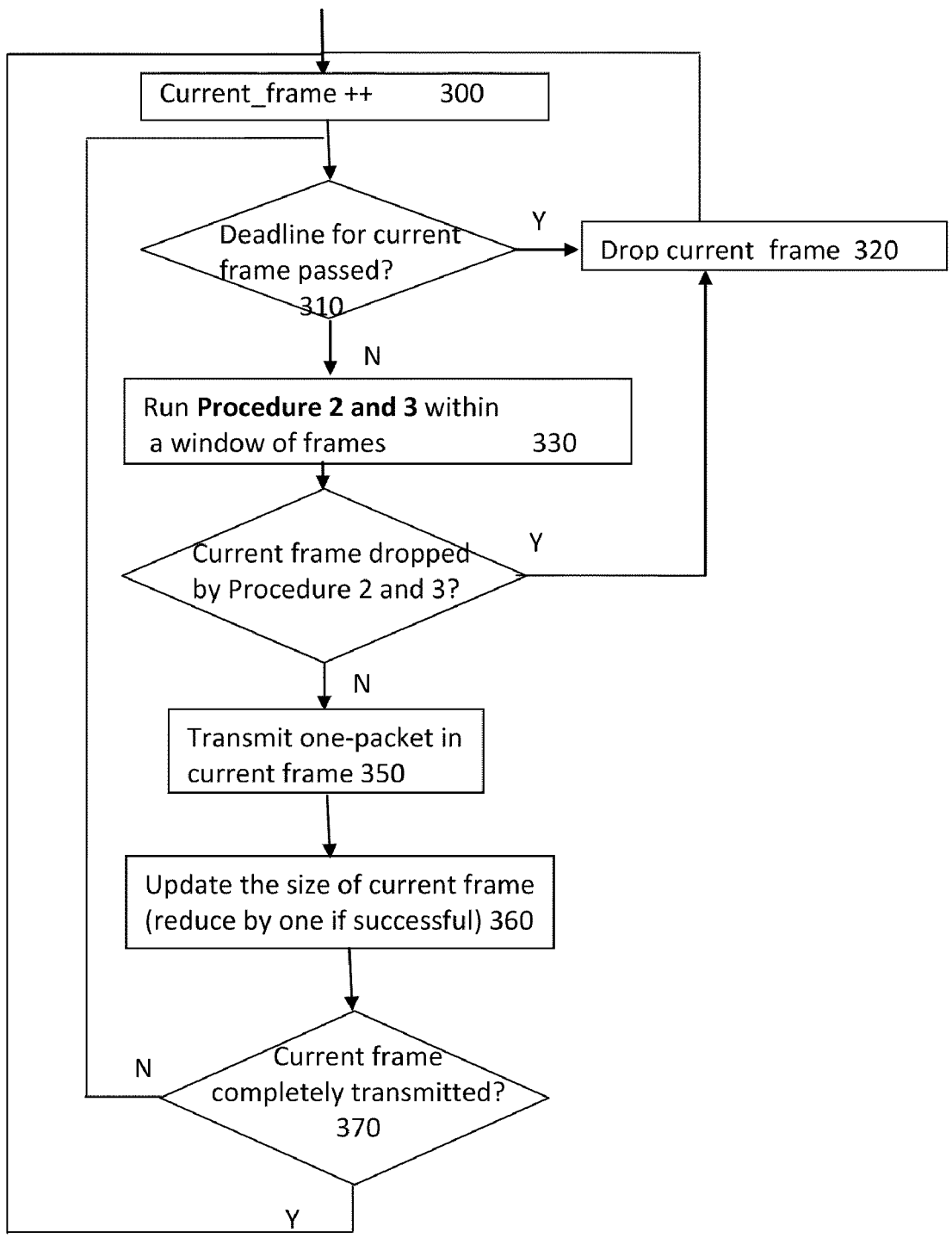
FIG. 2B shows an exemplary adaptive scheduling process.

Turning now to FIG. 2B, an adaptive scheduling process is shown. First, the current frame is updated to point to the next frame to be processed in 300. Next, the system checks to see if the deadline for the current frame has passed in 310. If yes, the current frame is dropped in 320 and the process loops back to 300 to handle the next frame. Alternatively, if time remains for the current frame, the process performs a determination of $u(i,T)$ with deadline constraints and random channel error probability in 330. The system then checks if the current frame is dropped by the process in 330. If the frame is to be dropped, the system proceeds to 320, and if not, the system transmits one packet of the current frame in 350. Next, in 360, the system then updates the size of the current frame by reducing the size by one (one unit is the size of data that can be transmitted in one slot) if the transmission was successful. The system then checks to see if the current frame has been successfully transmitted in 370. If not, the system loops back to 310. Alternatively, if the current frame is done, the process loops back to 300 to handle the next frame.

Figure 2C:
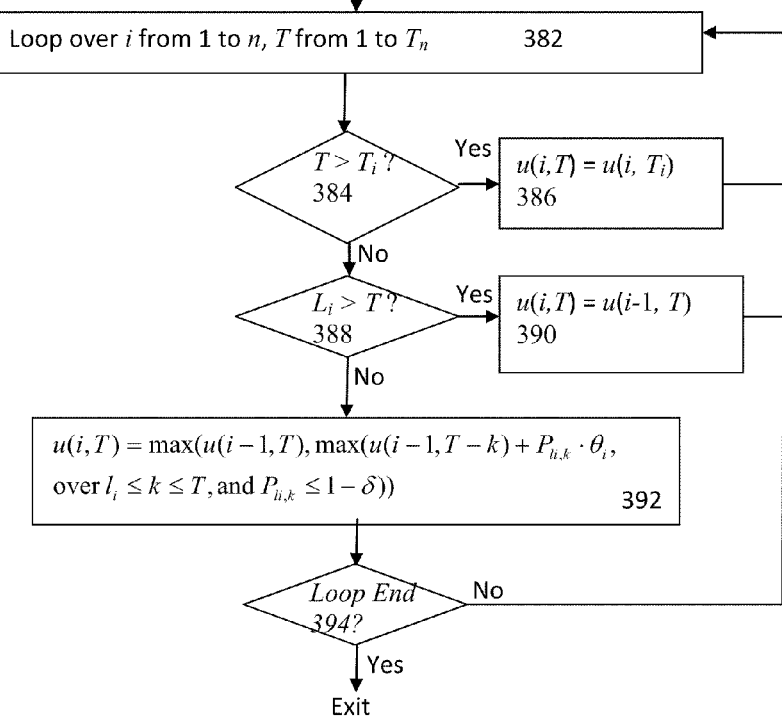
FIG. 2C shows an exemplary process for a determination of u(i, T) operation in FIG. 2B.

FIG. 2C shows an exemplary determination of $u(i, T)$, which is defined as the expected utility that can be attained by time T (slots) and with frames up to i. In 380, the system performs initialization. Next, the system loops from 1 to n in 382. If there is no deadline constraint and there is no channel error, $u(i,T)$ can be recursively calculated as in a regular knapsack problem. Where each frame has a deadline and the channel has an erasure error probability $p_e$ the system considers the deadline constraint and the frames are sorted in increasing order of their deadlines. In 384, the system calculates $u(i,T)$, if T is greater than the deadline $T_i$ of frame i, then $u(i,T)=u(i,T_i)$. In 388, if T is less than the current frame length $l_i$ (measured in number of slots required to transmit the frame), then $u(i,T)=u(i-1,T)$ in 390. Otherwise, the process calculates the expected utility $u(i,T)$ in 392 as $$u(i,T)=\max(u(i-1,T),\max(u(i-1,T-k)P_{l_i,k}+\theta_i, \text{over } l_i \leq k \leq T, \text{ and } P_{l_i,k} \leq 1\delta))$$

where $$P_{l,k} = \sum_{j=l}^{k} \binom{k}{j}(1p_e)^j p_e^{k-j}$$

is the probability of having at least l successful transmissions out of k attempts, $l_i$ is the length of frame i measured in number of slots required to transmit it. This equation takes into account the random channel error probability $p_e$ and it also limits the search of $P_{l_i,k}$ and reduces the complexity of the process. The system checks for the end of the loop in 394. If not, the system jumps to 382 to continue processing and alternatively, if done, the system exits.

Figure 2D:
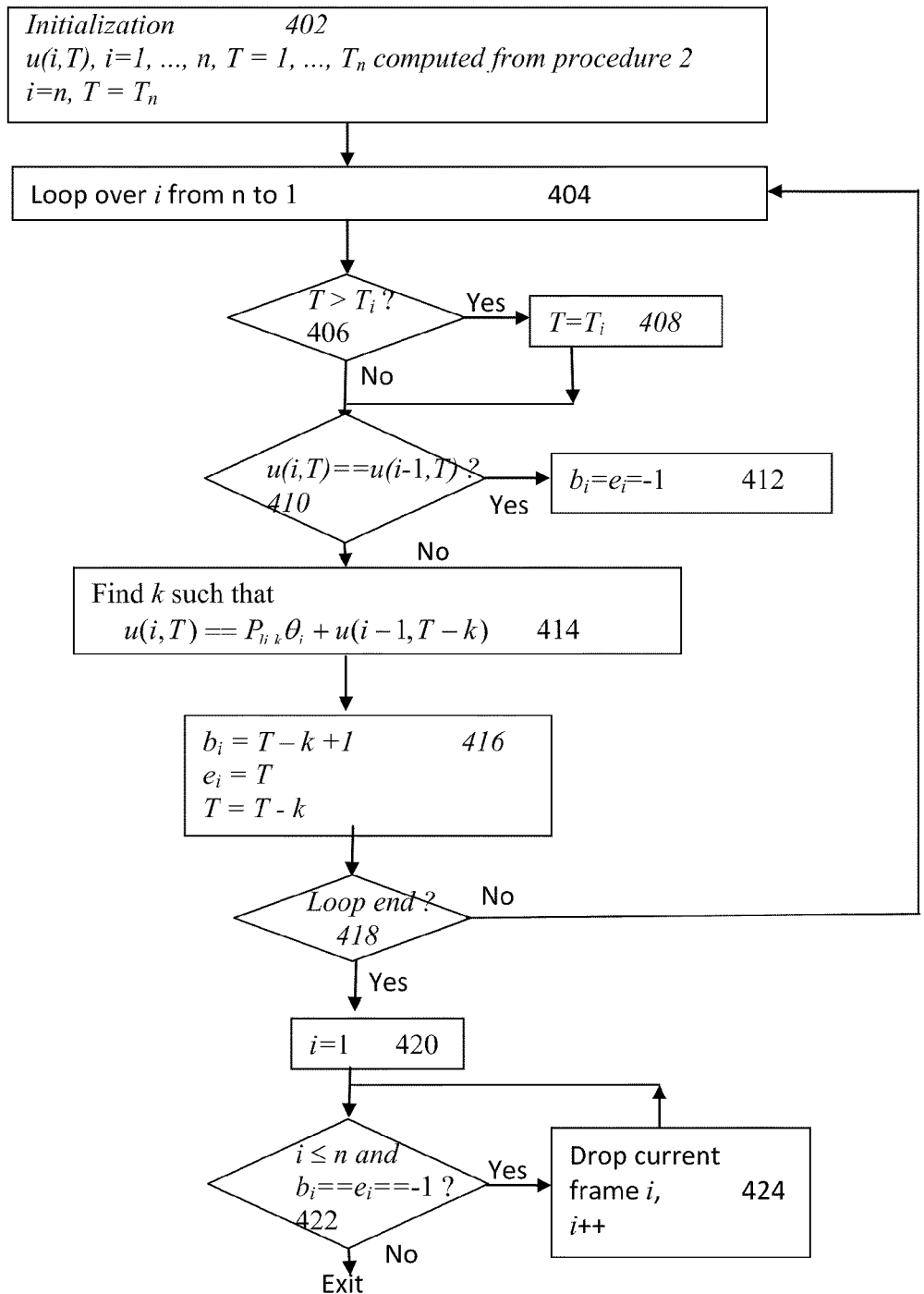
FIG. 2D shows an exemplary process to determine which frames are dropped by the scheduling procedure.

FIG. 2D shows an exemplary determination of which frame is transmitted and which frames are dropped. Frames that have passed their deadline will definitely be dropped. This process determines which frames are dropped even if their deadlines are not passed. It uses the results $u(i,T)$ obtained from procedure 2 in FIG. 2C.

The system is initialized in 402. Next, in 404-418, the process determines which frames are dropped. With $u(i,T)$, it back-tracks to compute the starting time ($b_i$) and the ending time ($e_i$) for each frame i. If $b_i=e_i=-1$, the system indicates frame i may not be scheduled. However, in 420-424, the process only drops those frames that are at the beginning of the sequence (starting from current time) with $b_i=e_i=-1$, as future channel conditions may become better.

In FIGS. 2A-2D, the system performs dynamic programming that considers both the deadline constraint of each frame and the channel uncertainty. The adaptive application of dynamic programming includes two key steps. First, the dynamic programming is applied on a small window of frames. Second, the scheduling process is re-run at each new transmission opportunity with the channel feedback (whether a transmission is successful or not). The complexity is reduced by limiting the search of $P_{l_i,k}$. The adaptive application of the dynamic programming is performed on a window of frames. The pseudo-code for the determination of $u(i, T)$ is as follows:

PROCESS 1

Recursive calculation of $u(i,T)$ with deadline constraints

```
u(O,T) = O, T = O, ..., T_n
u(i, O) = O, i = O, ..., n
if (T_i < T) then
    u(i,T) = u(i,T_i)
else if (l_i > T)
    u(i,T) = u(i-1,T)
else
    u(i,T) = max(u(i-1,T), u(i-1,T - l_i) + θ_i)
endif
```

PROCESS 2

Recursive calculation of $u(i,T)$ with deadline constraints and random channel error probability.

```
u(O,T) = O, T = O, ..., T_n
u(i, O} = O, i = O, ..., n
if(T_i < T) then
    u(i,T) = u(i,T_i)
else if (l_i > T)
    u(i,T) = u(i-1,T)
```

PROCESS 2-continued

Recursive calculation of u(i,T) with deadline constraints and random channel error probability.

```
  else
      u(i,T) = max(u(i 1,T),max(u(i 1,T k) P_{li,k} θ_i, over l_i k T,≦
      and P_{li,k} ≦ 1 − δ))
  endif
```

Through session negotiation, the lower layers (MAC and PHY) provide a transmission opportunity periodically (for example, this can be achieved by setting up a rtPS or UGS connection in WiMAX uplink or by applying a leaky bucket process in the down link). With each transmission opportunity, one packet can be transmitted. However, due to the wireless channel characteristics, the packet may not be transmitted successfully. For simplicity, each packet is assumed to have an independent error probability $p_e$.

Associated with each video frame i is a size $l_i$ (in units of packet), a deadline (decoding time) $T_i$, and an importance $\theta_i$. Only if all packets that belong to the same frame are received before the deadline $T_i$ successfully, the frame is considered received. Otherwise, it is considered lost. There are two types of deadlines. The playout deadline is the time by which a frame is needed for displaying. The decoding deadline is the time by which a frame is needed for decoding itself or other dependent frames. For example, if a B frame depends on two P frames $P_1$ and $P_2$, both frames $P_1$ and $P_2$ will be needed for decoding before the B frame is displayed. Therefore, the decoding deadline of a frame is the earliest deadline among the playout deadlines of all dependent frames including itself. In one embodiment, the system focuses only on the decoding deadline because it is the time by which the frame is needed in order to display the whole video sequence continuously.

The importance/utility of a frame can be defined in different ways. Two possible metrics are considered. In the first metric, the utility of a frame is defined as the reduction of peak signal to noise ratio (PSNR) if this frame is lost while all other frames are received. In the second metric, the utility of a frame is defined as the number of frames whose decoding is affected by this frame.

Figure 3:
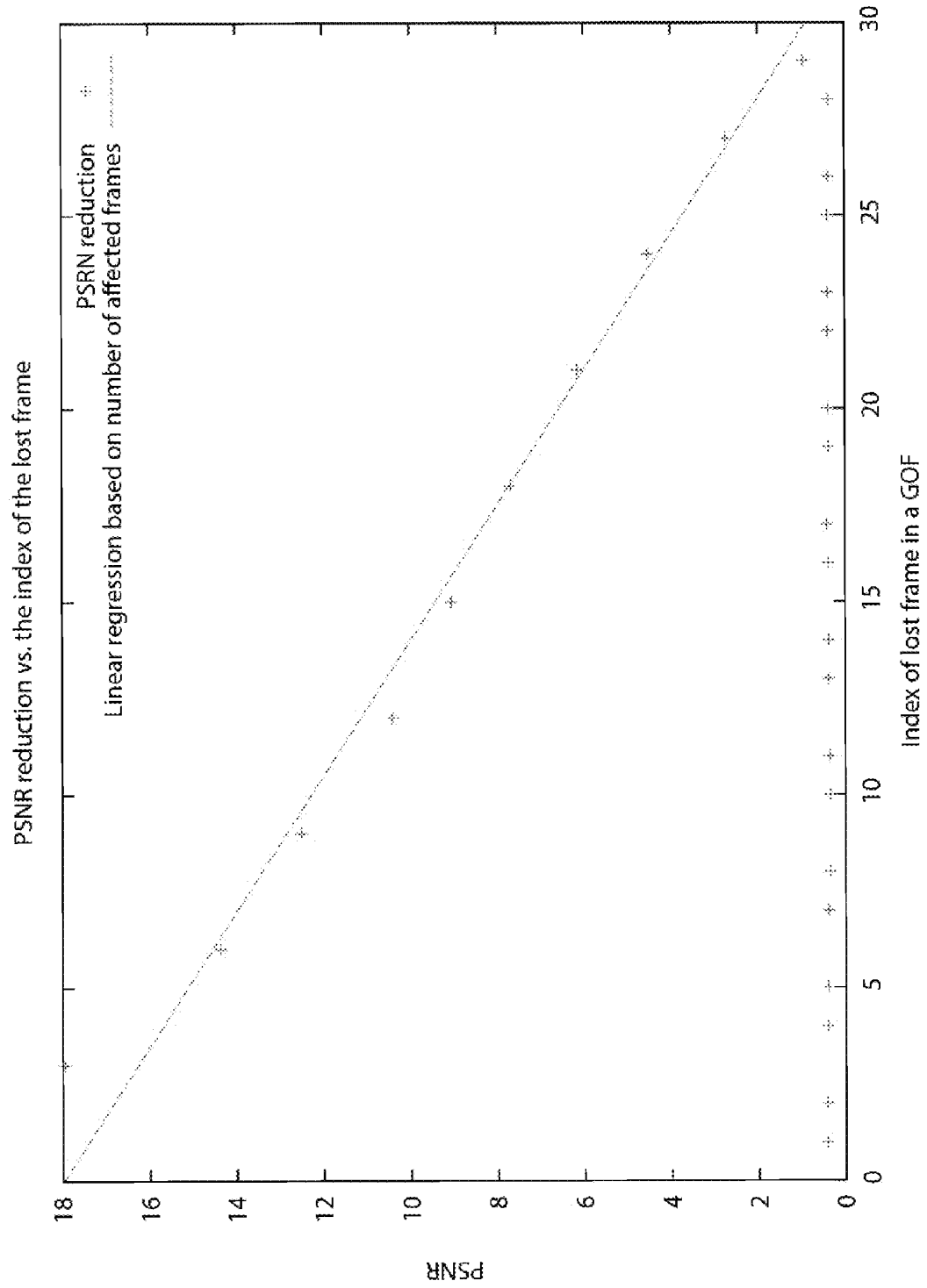
FIG. 3 shows a utility metric averaged over a video sequence.

FIG. 3 shows the first utility metric (based on PSNR reduction) averaged over the whole video sequence for each frame index in a Group of Frames, and the linear regression of the first metric on the second metric (based on the number of frames affected by the frame) using the Foreman CIF video sequence. In FIG. 3, the dots are the PSNR reduction if a given frame is lost and the line is the linear regression of the PSNR reduction on the number of frames affected by the given frame. The B-frames are ignored in the regression embodiment. These two utility metrics are highly correlated.

When the channel has sufficient bandwidth and channel condition is perfect, there is no need for an intelligent scheduling process as every packet can get through right away. When the channel bandwidth is not sufficient and there are packet errors, the system may need to drop some less important frames to allow sufficient time to transmit more important frames. Intuitively, we just select the least important frames to drop at the time of network congestion or bad channel conditions. However, it is not obvious to decide whether to drop a less important packet and how many packets need to be dropped, as demonstrated in FIG. 4. In the example of FIG. 4, F1 is a less important frame and F2 is a more important frame. If the channel condition of each slot is known, and if there is only one packet loss in slot 2 as in FIG. 4(a), frame F1 need not be dropped. But if there are two packet losses in slot 2 and slot 5 as in FIG. 4(b), F1 needs to be dropped in order to allow sufficient time for frame F2. Hence, the optimal decision on whether to drop a less important frame (F1) depends on the future channel conditions.

In practical networks, the channel conditions at a future time are not known, and therefore the decision is made based on the statistics of channel conditions (i.e., the packet error probability) and the system's objective is to maximize the expected utility of all frames that are received before their deadline.

Next, an adaptive scheduling process is discussed. A static scheduler is provided which calculates the scheduling of all packets before video streaming starts. The scheduler does not adaptively adjust its transmission policy based on the feedback from clients. The feedback is only used to retransmit packets.

In the following discussion, the schedule processes n frames, each with deadline $T_i$, importance $\theta_i$, and size $l_i$. Deadline is in units of transmission opportunity or slot, frame size is in units of packet and one packet is transmitted in one slot. In other words, the frame size is measured in number of slots required to transmit the frame. Since the system does not know exactly whether a packet can go through beforehand, it maximizes the expected total utilities based on the error probability $p_e$ of each packet.

For the special case where there is no channel error, this is essentially the knapsack problem with an additional deadline constraint: the system maximizes the total utilities of all frames that can be packed into a pipe with the constraint that each frame can only be put before their deadline. Its objective is to maximize the total utility of frames that can be held in the pipe and meet their deadline. In one embodiment, the following dynamic programming solution can be used. First, the frames are sorted according to their deadlines and if they have the same deadline, the system sorts them in the order of importance. If u(i,T) is defined as the maximum utility that can be attained with deadline at most T and with frames up to i, u (i,T) can be recursively calculated as follows.

```
                          Process 1
  1: u(O,T) = O, T = O, ..., T_n
  2: u(i, O) = O, i = O, ..., n
  3: if T_i < T then
  4:      u(i,T) = u(i,T_i)
  5: else if l_i > T then
  6:      u(i,T) = u(i − 1,T)
  7: else
  8:      u(i,T) = max(u(i − 1,T), u(i − 1,T − l_i) + θ_i)
  9: end if
```

In Process 1, line 4 states that if the time T is larger than the deadline $T_i$ of frame i, the maximum utility up to time T is the same as the maximum utility up to time $T_i$ for frames up to i. This is true because the frames have been sorted according to their deadlines. Line 6 states that if the size of a frame is larger than T, this frame does not contribute to the utility for time up to T. Line 8 states that the maximum utility of frames up to i and time up to T is obtained either by including frame i, which is $u(i−1, T−l_i)+\theta_i$, or not including frame i, which is u(i−1, T).

The maximum total utility is then $u(n,T_n)$. To avoid the recursive calculation, the system stores previous computation of u(i,T) in a two dimensional matrix. This leads to a dynamic programming solution. The complexity of the process is $O(nT_n)$.

For the more general case where each packet can be corrupted with probability $p_e$, if u(i,T) is the maximum expected utility that can be attained with deadline at most T with frames up to i, the recursive calculation of u(i,T) is as follows.

---
Process 2
---
1: u(O,T) = O, T = O, ..., $T_n$
2: u(i,O) = O, i = O, ..., n
3: if $T_i$ < T then
4:     u(i,T) = u(i,$T_i$)
5: else if $l_i$ > T then
6:     u(i,T) = u(i – 1,T)
7: else
8:     u(i,T) = max(u(i-1,T),max(u(i – 1,T – k) + $P_{l_i,k}$ $\theta_i$, over $l_i \leq$ k $\leq$ T and $P_{l_i,k} \leq 1 - \delta$))
9: end if

---

The difference between Process 1 and Process 2 is line 8. In line 8 of Process 2, the maximum utility u(i,T) again is obtained either by not including frame i, which is u(i–1,T), or including frame i. When frame i is included, k≧$l_i$ (other than exactly $l_i$) slots can be allocated to frame 1, and remaining T–k slots are allocated to previous i–1 frames. When k slots are allocated to frame i, the probability that frame i can be transmitted successfully is $P_{l_i,k}$, which is the probability of at least $l_i$ successful transmissions out of k attempts. $P_{l,k}$ is given by the following.

$$P_{l,k} = \sum_{j=l}^{k} \binom{k}{j}(1-p_e)^j p_e^{k-j} \quad (1)$$

k needs to be searched over all $l_i \leq k \leq T$ in order to obtain the optimal solution. Now u(i,T) can be again obtained through dynamic programming. If the constraint $P_{l_i,k} \leq 1-\delta$ in line 8 is ignored, the complexity of the process is O(n $T_n^2$).

Next, one embodiment that reduces computational complexity is discussed. In line 8 of Process 2, when k increases, $P_{l_i,k}$ goes to 1. When $P_{l_i,k}$ approaches one, the benefit of further increasing the re-transmission times is marginal and it is at the cost of reducing the utility of previous frames. The intent of the additional constraint $P_{l_i,k} \leq 1-\delta$ at the end of line 8 of Process 2 is to reduce the complexity of the process by limiting the searching range of k. Therefore, with the additional constraint, the process stops searching further for the optimal value whenever $P_{l_i,k} \leq 1-\delta$. With any positive $\delta$, line 8 of Process 2 only requires constant time. So the complexity is reduced to O(n$T_n$). The total utility is reduced at most by a ratio of $\delta$ compared to the optimal result. The optimal utility achieved by setting $\delta$=0 in Process 2 is denoted as $u_0(n,T_n)$ and the utility achieved by a general $\delta$>0 is $u_\delta(n,T_n)$. Then $$u_\delta(n,T_n) \geq (1-\delta)u_0(n,T_n)$$

The scheduling of each frame can be calculated backwards as in Process 3. Process 3 is used with Process 2, and to use with Process 1, a slight modification is needed. The process denotes $b_i$ and $e_i$ as the starting transmission time and ending transmission time of frame i. By setting them both to –1, the corresponding frame is dropped. The complexity of finding the schedule is O(n$T_n$) and it can be reduced to O(n) by recording the choice of k in each step of calculating u(i,T)

---
Process 3
---
1: i = n
2: T = $T_n$
3: for i = n downto 1 do
4:     if $T_i$ < T then
5:         T = $T_i$
6:     end if
7:     if u(i,T) == u(i – 1,T) then
8:         $b_i = e_i = -1$ (frame i is dropped)
9:     else if (u(i,T) == $P_{l_i,k} \theta_i$ + u(i – 1,T – k)) then
10:         $b_i$ = T – k + 1
11:         $e_i$ = T
12:         T = T – k
13:     end if
14: end for

---

Processses 2 and 3 are optimal either in the scenario where there is no feedback of each transmission and the base station uses FEC to encode $l_i$ packets of frame i onto k slots that was allocated to it, or in the scenario where feedback is only used to re-transmit packets in a frame but not used to dynamically adjust the scheduling policy. In our video over wireless systems, we assume the second scenario. At the time of scheduling, the scheduler first uses Process 2 and 3 to calculate the beginning time ($b_i$) and ending time ($e_i$) of each frame. The frame which is not dropped ($b_i \neq -1$) and has the earliest beginning time and whose ending time has not passed will be selected for transmission. This process is thus a non-adaptive scheduling process.

Next, a better use of the feedback from the receiver is discussed in conjunction with the example of FIG. 4. At the beginning based on the packet loss rate, the non-adaptive scheduling process schedules frame F1 to transmit at time 1. But at the end of time slot 1, the system is notified that the transmission in slot 1 has failed. Now at time slot 2, the system recalculates whether to continue transmitting frame 1 or not. Most likely, the system will switch to frame F2 directly at this time and drop frame F1. Therefore, the scheduler can dynamically adjust its transmission policy to further improve the expected total utility based on the feedback it receives. Whenever a feedback comes in, a new scheduling will be calculated. At the end, the whole calculation is only used to decide how many frames at the beginning of the queue (sorted according to the deadline of each frame) need to be dropped and which frame will be transmitted at the current allocated time slot. As a result, it is neither necessary nor important to perform the calculation over the whole video sequence. So the system can calculate the schedule in a window, and keep updating the window as time moves on. The flow diagram of this process which is referred to as adaptive scheduling process is shown in FIG. 2B above.

Next, tests of the non-adaptive scheduling process and the adaptive scheduling process are performed and the results are compared with three reference schemes:

Reference scheme 1: no-retransmission. In this scheme, once a frame is transmitted, it will not be retransmitted no matter whether it is received or not.

Reference scheme 2: retransmission till late. In this scheme, a frame is retransmitted until either it is successfully received or its deadline has passed.

Reference scheme 3: optimal offline scheduling. In this scheme, we assume the outcome of each transmission opportunity (time slot) is known. We then remove those time slots in which the transmission is not successful and apply Process 1 to obtain the optimal scheduling.

To perform a fair comparison of all schemes, a pseudo-random channel error pattern is pre-generated for use by all schemes. The optimal scheduling process is optimal in the sense of maximizing the total utilities achieved but not in the sense of maximizing the resulting PSNR. These two metrics are not exactly the same although they are often consistent.

The average PSNR of the final video sequence decoded is used. For those frames that are dropped or received late, a simple error concealment is used. This scheme copies the last video frame that is successfully received.

The parameters of the process together with their default values are listed in Table 1.

TABLE 1

PARAMETERS AND THEIR DEFAULT VALUES

| Parameters | Default Values |
| --- | --- |
| Metric of importance | metric 1 (PSNR-DEC) |
| Window size | 60 frames |
| δ | 0.01 |
| Initial buffer time | 0.5 s |

The Foreman video sequences are encoded by the H.264 codec at 30 frames per second at 600 Kbps, using a typical IBBPBBP . . . coding structure with group of picture (GOP) size 30. Initial buffer time is 500 ms unless specified otherwise. The original duration of both of the video sequences is 10 seconds. To make the results less dependent on the initial buffer time, we increase the video time to 30 seconds by repeating the video three times. Simulations are performed using other video sequences and similar performance is observed.

Figure 5:
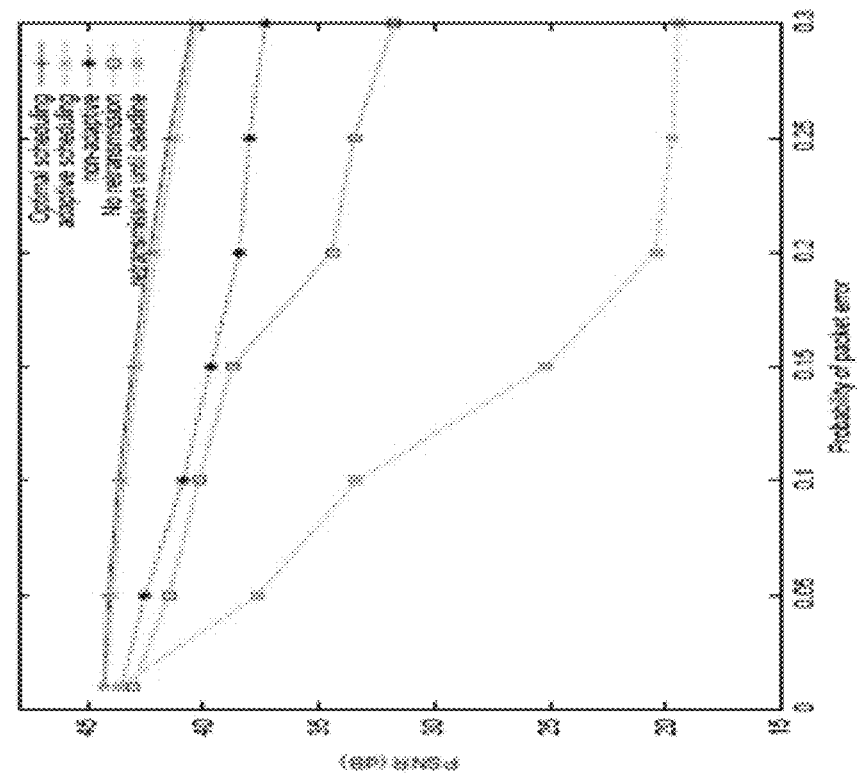
FIGS. 5(a) and 5(b) are diagrams illustrating a comparison of different scheduling schemes.
Figure 5:
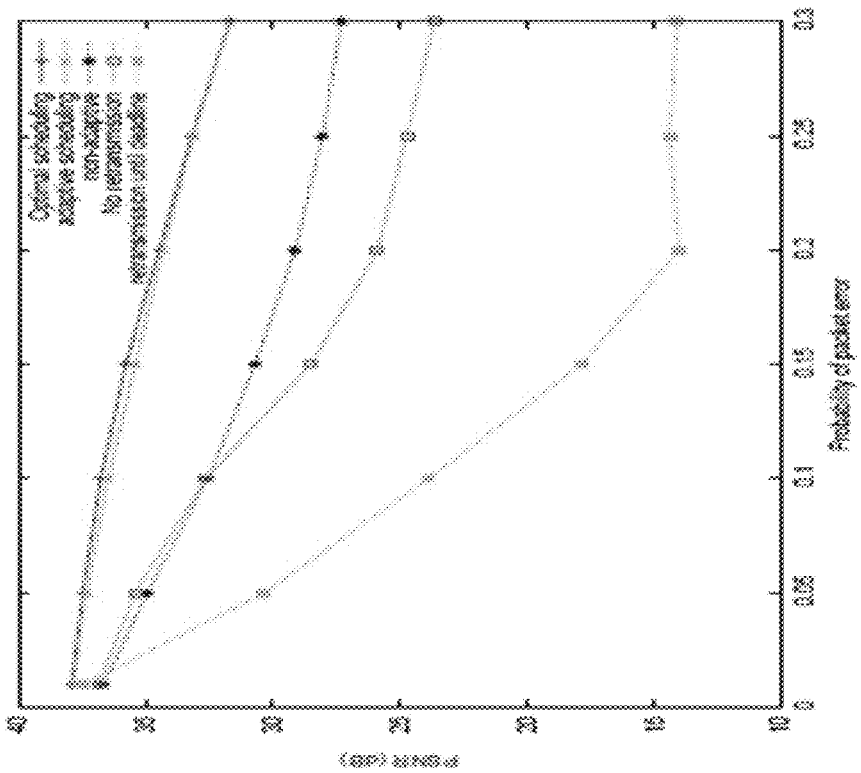

The embodiments were tested against the reference procedures using the Foreman and Mother_and_daughter sequence. FIG. 5 shows the achieved PSNR for each scheme. The adaptive scheduling procedure achieves a performance very close to the optimal scheduling procedure and both demonstrate a smooth degradation of video quality as the packet error rate increases. The non-adaptive procedure has around 5 dB loss in PSNR in most cases compared to the adaptive scheduling procedure. It is interesting to observe that the retransmission-till-late scheme is much worse than the no-retransmission scheme. The reason is that most of the important frames (such as I frames) have relatively large size. If the previous less important frames are retransmitted, it is likely that the larger, more important frame following them will not have sufficient time to transmit.

Figure 6:
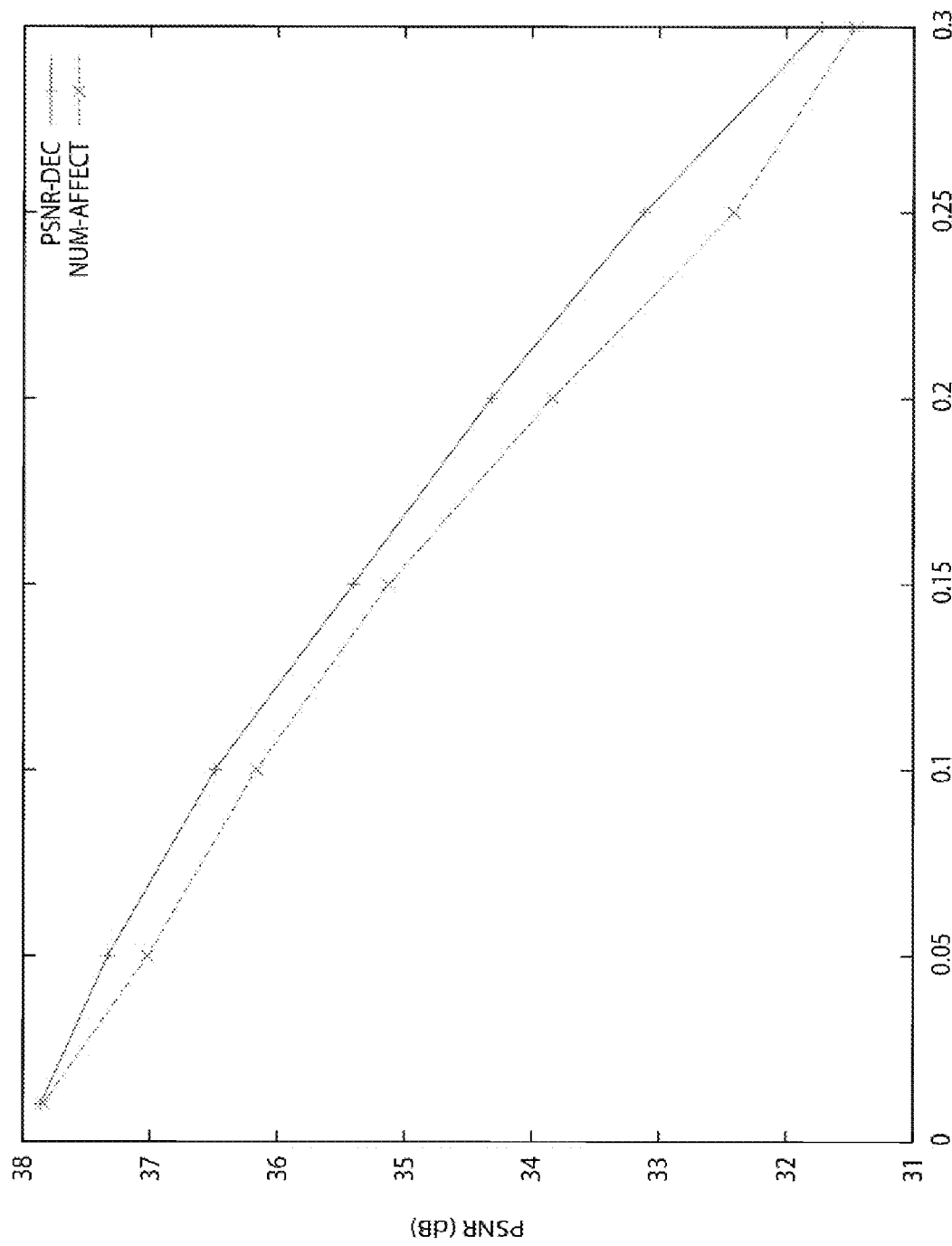
FIG. 6 shows a comparison of various exemplary importance metrics.

The parameter choices can affect the performance using the Foreman sequence. FIG. 6 is a comparison of different importance metrics. "PSNR-DEC" refers to the metric of PSNR deduction if this frame is lost and "NUM-AFFECT" refers to the metric of the number of frames that are affected by this frame. FIG. 6 compares the two importance/utility metrics. PSNR-DEC refers to the first metric and NUM-AFFECT refers to the second metric. From this figure, using the number of affected frames as the performance metrics leads to a PSNR loss of no more than 0.5 dB in most cases. Therefore, when the exact loss of PSNR caused by each frame is not available, it is acceptable to use the number of affected frames as the performance metric.

Figure 7:
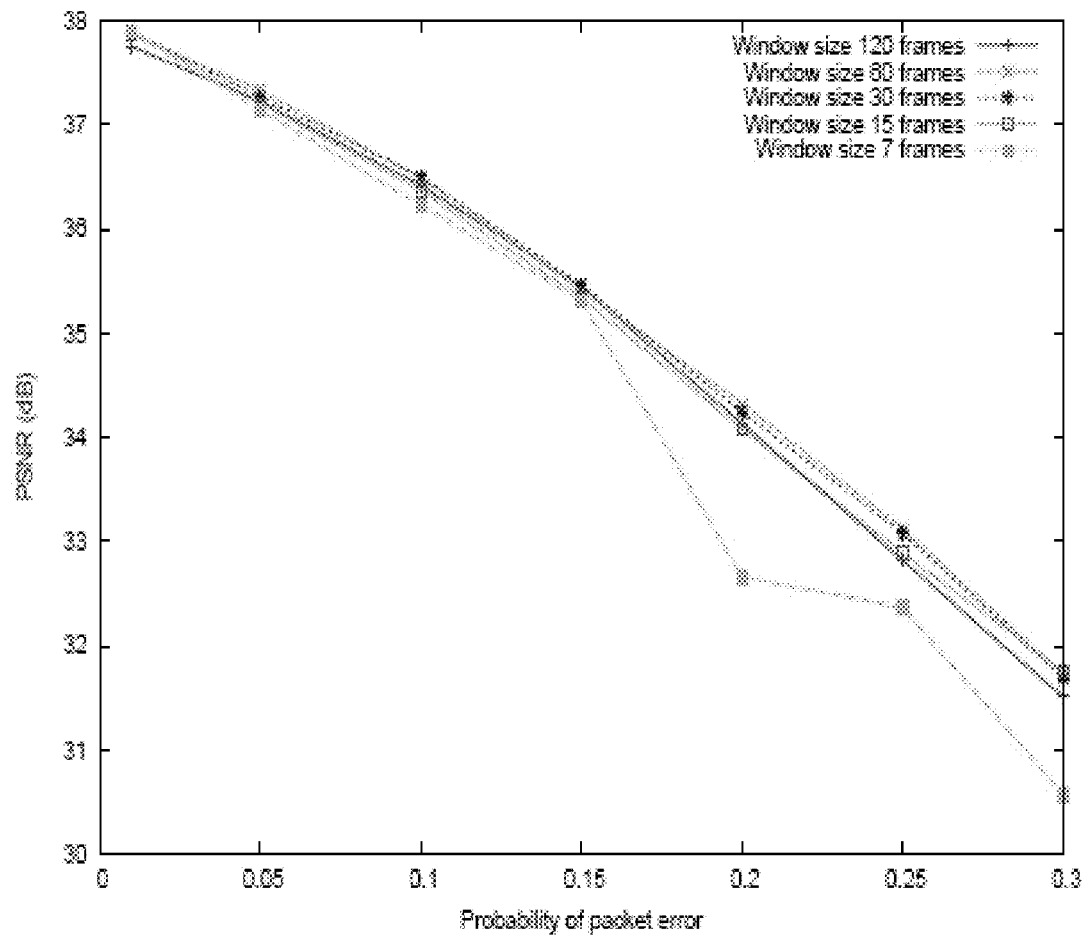
FIG. 7 shows a comparison of the performance of various window sizes.

FIG. 7 shows how the window size affects the final received PSNR. It is interesting to observe that both a small window size and a large window size lead to bad video quality. Within the range of window size from 15 frames to 60 frames, the results are quite insensitive to the choice of the window size.

Figure 8:
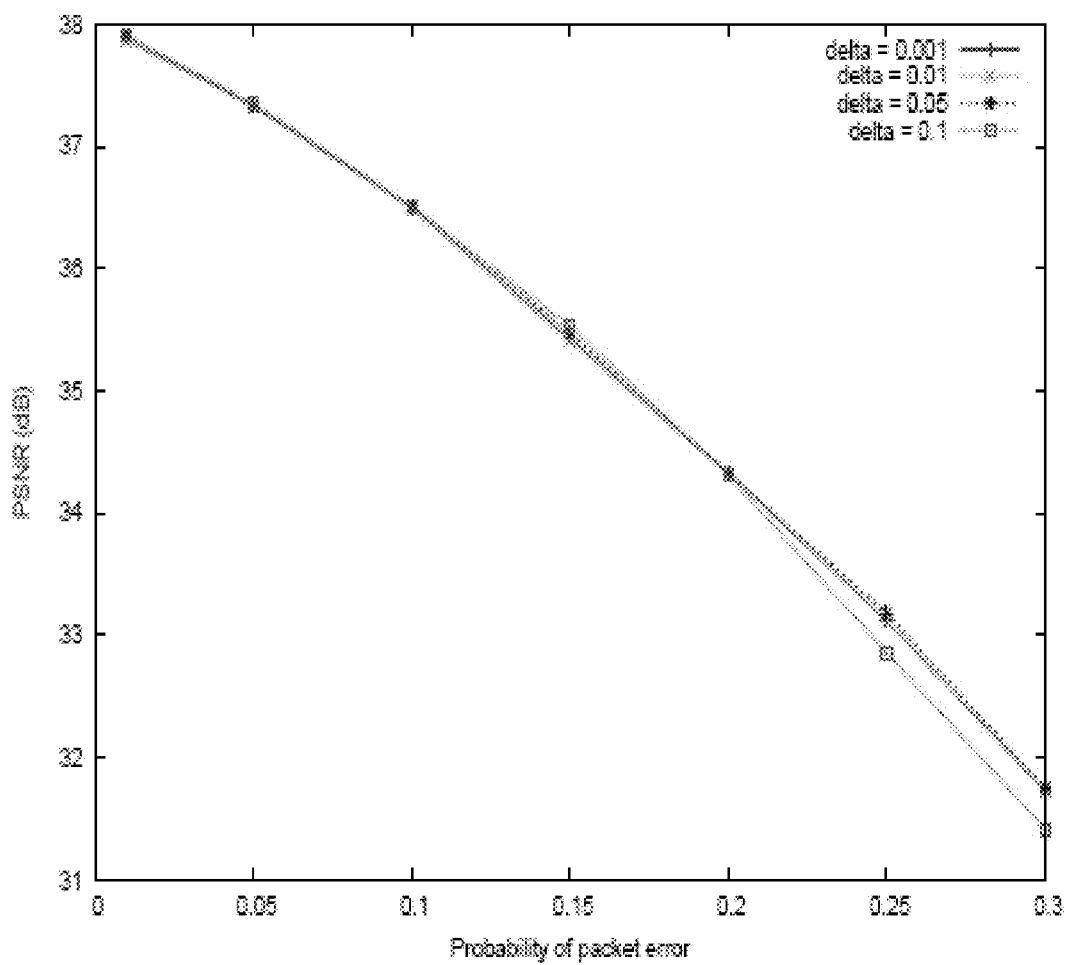
FIG. 8 is a chart showing a comparison of different thresholds used in the frame selection process.

FIG. 8 shows the performance for different δ, the parameter used in Procedure 2 to decide the stopping time of searching over k. Again, the results are insensitive to choice of δ as long as it is chosen smaller than 0.05.

Figure 9:
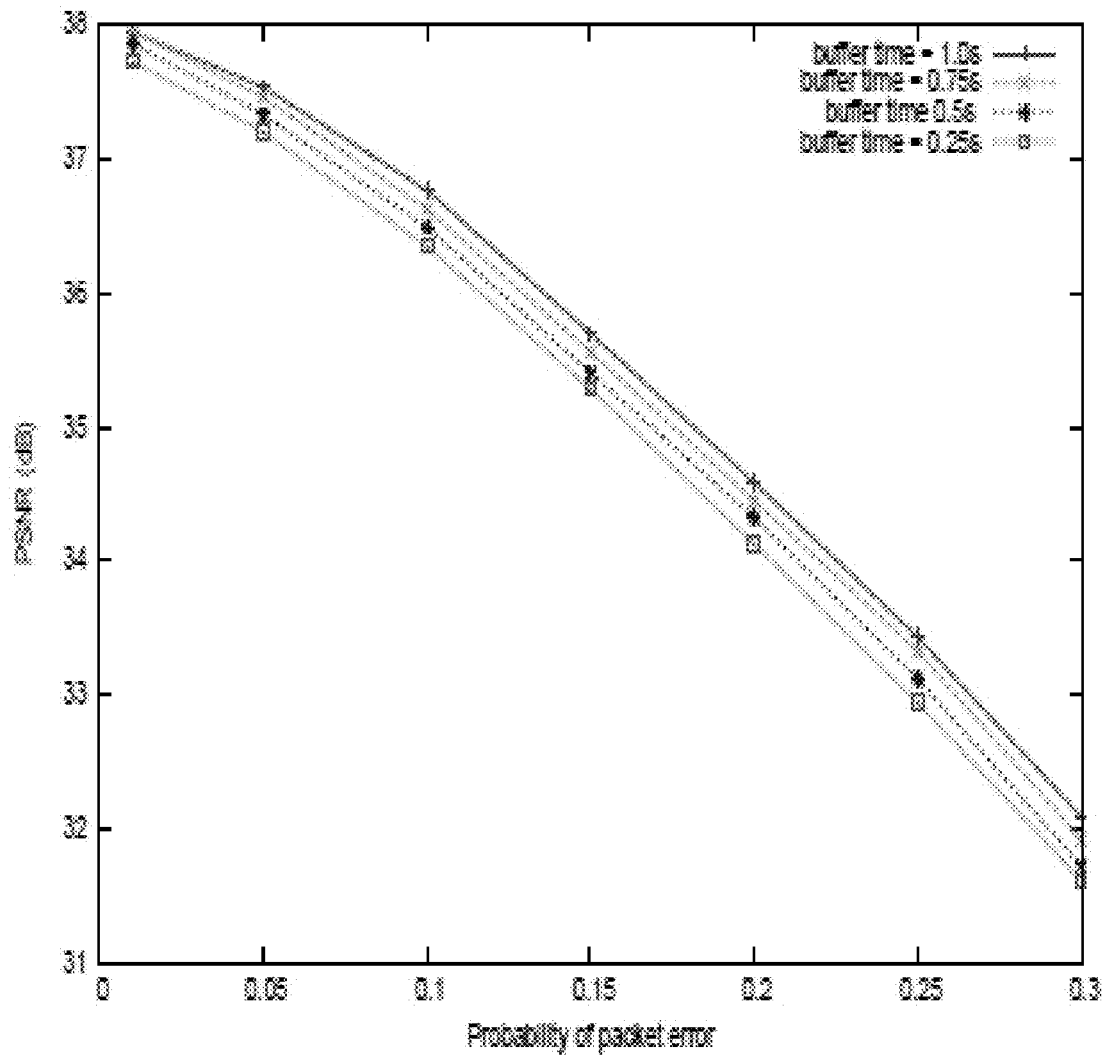
FIG. 9 is a chart illustrating performance variations due to initial buffer time.

FIG. 9 shows a comparison of different initial buffer time. The initial buffer time determines how much extra delay can be accepted for each frame. FIG. 9 shows the achieved PSNR for different initial buffer time. The received video quality steadily increases as the buffer time increases.

The experimental results show the robust transmission capability of the scheduling procedure that dynamically drop less important frames to give more transmission opportunities to more important frames based on the deadline, importance, and size of each video frame. Simulation results show that the adaptive scheduling procedure achieves a near-optimal performance and the results are insensitive to the choice of the values of the parameters.

The system robustly handles packet scheduling of video frames in the last wireless hop. At the time of network congestion and bad channel conditions, it is necessary to drop some (less important) frames in order to maintain the continuity of the video streaming. The decision on whether to drop and how many frames need to be dropped has to be based on the deadline, size, and importance (in terms of the contribution to the video quality) of each frame. The adaptive scheduling procedure dynamically decides which frames need to be transmitted and which ones need to be dropped at any transmission opportunity based on the current channel conditions and on the characteristics of each video frame.

The system prioritizes the packet transmission and selectively drop packets at the wireless last hop. Packets that are the least important in terms of overall PSNR should be dropped first. This approach is agile and requires no communication between video server and the base station. In another embodiment, the process of FIG. 2A-2D can be combined with base station scheduling procedures that exploit the channel and user diversity over multi-carrier and multi-user wireless systems.

The system is more computationally efficient. In contrast with conventional systems with exponential complexity, the complexity of system is $O(n\, T_n)$ where n is the number of frames in a controllable window, and $T_n$ is the deadline of the last frame in the window. The system does not produce bursty traffic relative to conventional solutions. The preferred embodiment assumes the transmission opportunity is regularly assigned and the video frames are transmitted only on the assigned transmission opportunity and thus the generated traffic is smooth and regular. The system considers multiple frames jointly and enables optimization across a window of frames. A relatively small window size (30-60) achieves near-optimal performance. The system is applicable to OFDM/OFDMA based systems (i.e., WiMAX, LTE, WiFi) when combined with a per-BS scheduling process.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method to transmit streaming video over a wireless network channel with periodic transmission opportunities, comprising:
    receiving a plurality of video frames for transmission, each frame having an importance θ and a deadline by which the frame is to be received;
    transmitting video frames at each transmission opportunity with a scheduler, wherein the scheduler maximizes the total importance for all frames to be received within each frame deadline by applying dynamic programming on a predetermined window of frames and updating the scheduler with a channel feedback;
    applying random channel error probability in selecting the frames;
    determining an expected utility u(i, T) as attainable by deadline T with up to i frames; and
    recursively determining the expected utility u(i, T) as u(i, T)=max (u(i−1, T), max (u(i−1, T−k)$P_{l_i,k} \cdot \theta_i$, over $l_i \leq k \leq T$ and $P_{l_i,k} \leq 1-\delta$)) where $$P_{l,k} = \sum_{j=l}^{k} \binom{k}{j}(1 p_e)^j p_e^{k-j}$$

is the probability of having at least l successful transmissions out of k attempts, $l_i$ is the length of time of frame i, and $p_e$ is the packet error probability at one transmission.

2. The method of claim 1, comprising determining u(i, T) as a maximum utility (importance) that can be attained with a deadline T and with frames up to i.

3. The method of claim 2, comprising determining u(i, T)=u(i, $T_i$) if T is greater than the deadline $T_i$ of frame i and otherwise determining u(i, T) first recursively and then using dynamic programming.

4. A method to transmit streaming video having a plurality of frames over a wireless channel, each frame having an importance measure relating to video quality, comprising:
    maximizing a total importance measure for all frames to be received within each frame deadline through dynamic programming with a predetermined window of frames;
    dynamically scheduling one or more frames to be transmitted or dropped at each transmission opportunity based on current channel conditions and on characteristics of each video frame;
    updating the dynamic schedule with a channel feedback;
    applying random channel error probability in selecting the frames;
    determining an expected utility u(i, T) as attainable by deadline T with up to i frames; and
    recursively determining the expected utility u(i, T) as u(i, T)=max (u(i−1, T), max (u(i−1, T−k)$P_{l_i,k} \cdot \theta_i$, over $l_i \leq k \leq T$ and $P_{l_i,k} \leq 1-\delta$)) where $$P_{l,k} = \sum_{j=l}^{k} \binom{k}{j}(1-p_e)^j p_e^{k-j}$$

is the probability of having at least l successful transmissions out of k attempts, $l_i$ is the length of time of frame i, and $p_e$ is the packet error probability at one transmission.

5. The method of claim 4, comprising deciding frame(s) to be dropped based on deadline, size and importance of each frame.

* * * * *